United States Patent [19]

Kostanty et al.

[11] Patent Number: 4,524,461
[45] Date of Patent: Jun. 18, 1985

[54] HELMET-SUPPORTED RADIO TRANSCEIVER AND BROADCAST RECEIVER SYSTEM

[75] Inventors: Raymond G. Kostanty, Wood-Ridge, N.J.; Michael Sciabbarrasi, New York, N.Y.; Walter B. Grossman, Fair Lawn, N.J.

[73] Assignee: American Transceiver Corp., Fair Lawn, N.J.

[21] Appl. No.: 514,843

[22] Filed: Jul. 18, 1983

[51] Int. Cl.³ .............................................. H04B 1/46
[52] U.S. Cl. ...................................... 455/79; 455/88; 455/89; 455/351
[58] Field of Search ...................... 455/79, 82, 88, 89, 455/90, 140, 351; 381/110

[56] References Cited

U.S. PATENT DOCUMENTS

| | | | |
|---|---|---|---|
| 3,169,221 | 2/1965 | Franchi | 455/79 |
| 3,218,607 | 11/1965 | Brock et al. | 455/89 |
| 3,277,374 | 10/1966 | Kobayashi . | |
| 3,283,074 | 11/1966 | Csicsatka | 455/79 |
| 3,493,681 | 2/1970 | Richards . | |
| 3,887,872 | 6/1975 | Sharpe | 455/88 |
| 3,956,591 | 5/1976 | Gates . | |
| 3,971,985 | 7/1976 | Aral . | |
| 4,060,766 | 11/1977 | Kamuo . | |
| 4,105,974 | 8/1978 | Rogers . | |
| 4,130,803 | 12/1978 | Thompson | 455/351 |
| 4,152,553 | 5/1979 | White | 455/89 |
| 4,164,709 | 8/1979 | Tudor . | |
| 4,178,548 | 11/1979 | Thompson . | |
| 4,184,115 | 1/1980 | Munakata et al. . | |
| 4,216,432 | 8/1980 | Imazeki et al. | 455/79 |
| 4,334,315 | 6/1982 | Ono et al. . | |
| 4,357,711 | 11/1982 | Drefko . | |

OTHER PUBLICATIONS

"CB Switcher for Music Between Calls"–Sante, Radio Electronics, Dec. 1977, pp. 40, 41.

Primary Examiner—Marc E. Bookbinder
Attorney, Agent, or Firm—Anthony F. Cuoco

[57] ABSTRACT

A system is disclosed which includes a radio transceiver and a radio broadcast-band receiver housed in a package that is supported by a helmet of the type worn by mobile users such as motorcycle, bicycle, moped and skateboard riders and the like; or by non-mobile users such as policeman, fireman, construction workers and the like. In the absence of signals to or from the transceiver the user listens to radio broadcasts. Voice actuated circuitry disables the radio receiver and enables the transceiver transmitter for message transmission by the user to a remote station against a background of silence, or against a background of the user's voice. Other circuitry is responsive to a message from a remote station received by the transceiver receiver for disabling the radio receiver so that message is heard by the user against a background of silence. The arrangement is such that the circuitry automatically detects the presence of transceiver signals and responds by: (1) disabling just the radio receiver; or (2) by disabling the radio receiver, disabling the transceiver receiver and enabling the transceiver transmitter for predetermined intervals.

13 Claims, 7 Drawing Figures

HELMET-SUPPORTED RADIO TRANSCEIVER AND BROADCAST RECEIVER SYSTEM

BACKGROUND OF THE INVENTION

The increase in activities requiring helmets or like headgear has made it desirable to package entertainment and communications equipment with the helmet. The entertainment equipment best features a radio for broadcast-band, shortwave band or television soundband reception, and the communications equipment best features a transceiver for two-way communication between the user and a remote station.

Packaging is desirable whereby the necessary electrical circuitry is supported on the inside of the helmet and is relatively undetectable when the helmet is worn. When retrofitting is desired the interior of the helmet requires some alteration to accommodate the circuit package, but the exterior of the helmet remains unchanged, except perhaps to accommodate an antenna. Packaging is also desirable whereby the necessary circuitry is supported on the outside of the helmet.

Accordingly, it is an object of the present invention to provide radio/transceiver circuitry packaged so as to be easily supported by a helmet, and whereby, in the absence of signals to or from the transceiver, the user listens to radio broadcast signals, or to external signals (such as from a cassette player) connected by: (1) a wire to a circuit input jack; or (2) a light beam from an external source to a light beam detector included in the circuitry.

SUMMARY OF THE INVENTION

This invention contemplates a helmet-supported radio transceiver and broadcast-band receiver system for entertainment and communication purposes. When it is desired to communicate a message to a remote station, the user speaks into a microphone and circuitry detects the voice for activating a pair of switches. The first switch disables the broadcast-band receiver so that the user can transmit a message to the remote station against a background of silence or against a background of his own voice. After the user stops speaking for a predetermined interval, the transceiver transmitter is disabled and the transceiver receiver is enabled so that the user can listen for a response to the transmitted message. To spare the user the annoyance of having to listen to a short burst of radio broadcast reception during the period between the end of a message transmission and the beginning of a message reception, the radio receiver is not enabled for a predetermined interval after the transmission ends.

The circuitry responds to an incoming message via the transceiver receiver by disabling the radio receiver so that the user hears the message against a background of silence. Again, the radio receiver is enabled only after the transceiver receiver is silent for a predetermined interval. The arrangement is such that the transceiver will operate in a half-duplex mode, i.e. the transceiver will transmit and receive on the same frequency, or operate in a full-duplex mode, i.e. the transceiver transmits on one frequency and receives on another frequency. In the latter case, speaking into the microphone disables only the radio receiver and not the transceiver, so that the user can hear incoming messages even while he is speaking, as with an ordinary telephone.

DETAILED DESCRIPTION OF THE INVENTION

Figure 1:
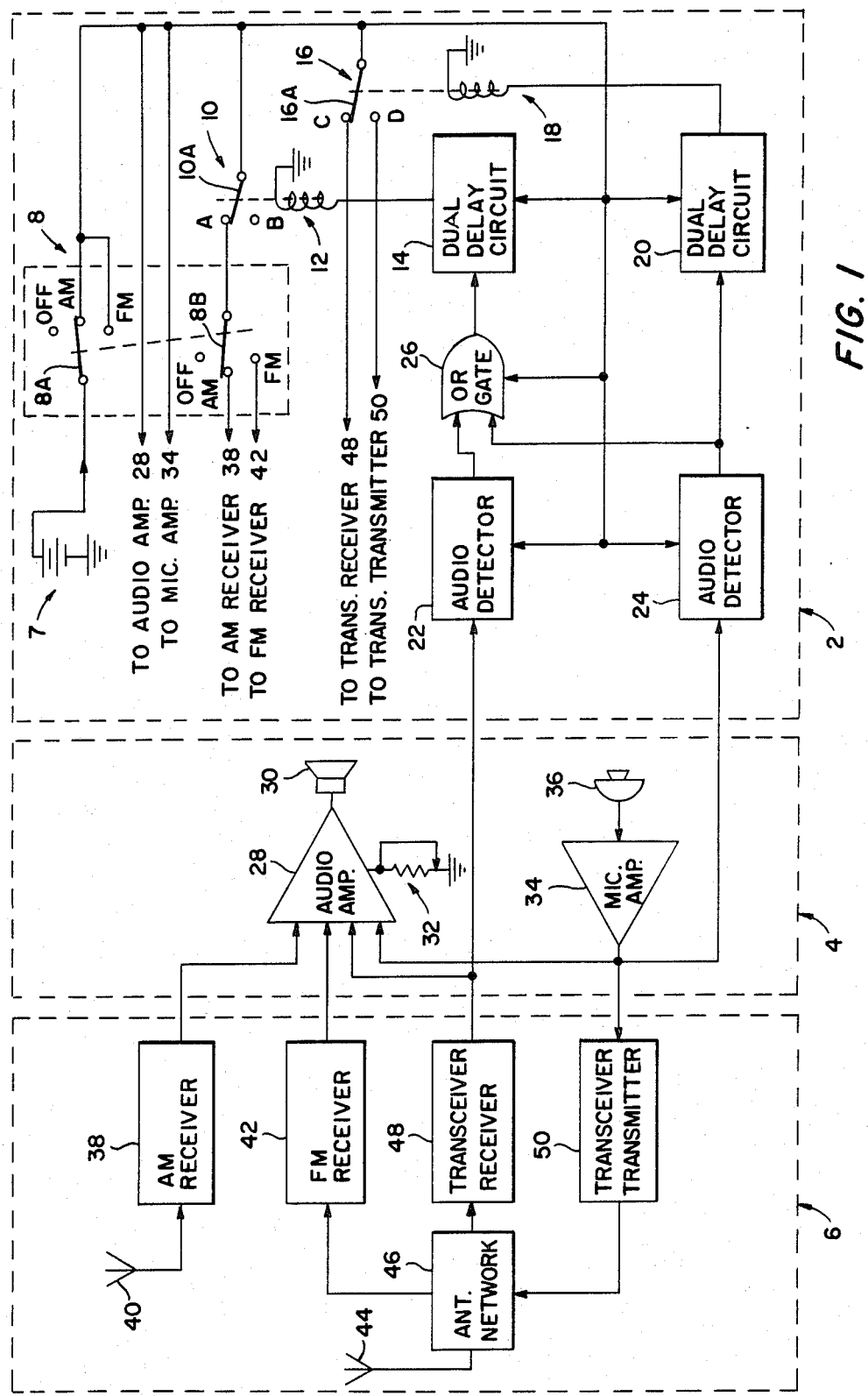
FIG. 1 is a block diagram of radio receiver and transceiver circuitry in accordance with the invention, wherein the transceiver circuitry is illustrated in half-duplex configuration.

With reference to FIG. 1 the circuitry of the invention includes a power switching section designated generally by the numeral 2, an audio section designated generally by the numeral 4, and a radio section designated generally by the numeral 6.

Power switching section 2 includes a source of d.c. voltage shown as a battery 7 which may be a conventional nine-volt battery. Battery 7 is connected to a double-pole, three-position switch designated generally by the numeral 8. Switch 8 has an arm 8A and an arm 8B, each of which arms 8A and 8B are operator-operable to either "off", "AM" or "FM" positions. The arms are shown in the AM position in the Figure as an example.

The voltage from battery 7 is applied through switch 8 to an audio amplifier 28 and to a microphone amplifier 34 included in audio section 4. The voltage from battery 7 is applied to a switch 10 and therefrom through switch 8 to, for example, an AM receiver 38 and an FM receiver 42 and to a switch 16 and therefrom to transceiver transmitter 50 or a transmitter receiver 48 in radio section 6.

Switches 10 and 16 are single-pole, two-position switches. Switch 10 has an arm 10A which is positioned via a solenoid 12 to a position "A" or a position "B", with the arm shown in position A in the Figure as an example. Switch 16 has an arm 16A positioned via a solenoid 18 to a position "C" or a position "D", with the arm in position C in the Figure as an example.

Solenoid 12 is actuated by a dual delay circuit 14 and solenoid 18 is actuated by a dual delay circuit 20 included in power switching section 2. Dual delay circuits 14 and 20 are generally shown in FIG. 1 and will be more particularly illustrated and described with reference to FIGS. 5 and 6.

Dual delay circuits 14 and 20 are energized by battery 7 via switch 8. An audio detector 22, an audio detector 24 and an OR gate 26 included in power switching section 2 are likewise energized by battery 7 via switch 8.

Dual delay circuit 14 is driven by OR gate 26 in response to inputs from audio detector 22 of audio detector 24. Dual delay circuit 20 is driven by audio detector 24.

An antenna 40 is connected to AM receiver 38 (radio-section 6), which applies an input to audio amplifier 28 (audio section 4). Audio amplifier 28 receives inputs from FM receiver 42, transceiver receiver 48 and microphone amplifier 34 (audio section 4). A speaker (speakers) 30 is (are) coupled to audio amplifier 28 and an operator-operable potentiometer 32 is connected to the audio amplifier for purposes to be hereinafter described.

A microphone 36 is connected to microphone amplifier 34 (audio section 4) which applies an input to transceiver transmitter 50 (radio section 6). An output is applied to antenna network 46 coupled to an antenna 44. Antenna network 46 applies an output from antenna 44 to transceiver receiver 48 and to FM receiver 42 (radio section 6).

OPERATION OF THE CIRCUITRY

The circuitry described with reference to FIG. 1 is powered by battery 7 when the user of the invention actuates switch 8 so that arms 8A and 8B thereof are in either the AM or FM position. With power thus applied, audio amplifier 28, microphone amplifier 34, audio detector 26, dual delay circuits 14 and 20, audio detector 24 and OR gate 26 are energized. With no outputs from microphone amplifier 34 and transceiver 48, the outputs from audio detectors 22 and 24, OR gate 26, dual delay circuits 14 and 20 and audio detector 24 will be at a steady state "low" level. Switch arms 10A and 16A of switches 10 and 16, respectively, will be positioned dependent upon the output levels of dual delay circuits 14 and 20 which energize solenoids 12 and 18, respectively.

When the output level of dual delay circuit 14 is "low", switch 10 has its arm 10A in position A as shown in the Figure. FM receiver 42 of AM receiver 38, depending upon the position of arm 8B of switch 8, i.e. AM or FM, are energized.

When the output level of dual delay circuit 20 is "low", switch 16 has its arm 16A in position C as shown in the Figure. Transceiver receiver 48 is energized and transceiver transmitter 50 is not energized. Antenna network 46 is normally a passive network and requires no energization.

When AM receiver 38 is energized it processes the signal it receives from antenna 40 and provides an audio output signal that drives amplifier 28 which in turn drives speaker (or speakers) 30. When FM receiver 42 and transceiver receiver 48 are energized they process the signals they receive from antenna 44 via antenna network 46 and provided audio output signals that drive audio amplifier 28. Potentiometer 32 is operator-operable for adjusting the gain of amplifier 28 as is well understood by those skilled in the art.

Under the conditions described, the user of the invention hears the output of either AM receiver 30 or FM receiver 42. Transceiver 48 is energized and monitors the frequency band to which it is tuned.

In responding to incoming messages, transceiver receiver 48 provides an audio output. Audio detector 22 responds to this audio output so that the output level of the audio detector changes from a "low" to a "high." OR gate 26 responds to a "high" at either of its inputs by providing a "high" at its output which is applied to dual delay circuit 14. Dual delay circuit 14 has a delay feature to be hereinafter described that delays the "high" at its input for an interval such as, for example, 0.2 seconds and then provides a "high" at its output which is effective for energizing solenoid 12 to change the position of arm 10A of switch 10 from position A to position B, and to thereby remove power from AM receiver 38 and FM receiver 42. Under these conditions transceiver receiver 48 receives a message which is heard in the absence of competition from AM or FM signals. That is to say, the message is heard against a background of silence.

The heretofore noted delay interval accomplished through dual delay circuit 14 prevents any brief random interference or spurious signals appearing at the output of transceiver receiver 48 from changing the position of switch arm 10A. The output level of dual delay circuit 14 returns to a "low" only after the input to the dual delay circuit has been "low" for a predetermined interval such as for example 3.0 to 5.0 seconds.

The user of the invention may respond to an incoming message or initiate an outgoing message by speaking into microphone 36. Microphone amplifier 34 processes the output of microphone 36 and provides an output which modulates transceiver transmitter 50. This output is applied to antenna 44 via antenna network 46; to audio amplifier 28, whereby the user can monitor has own speech inputs; and to audio detector 24. Audio detector 24 provides a "high" that is applied to OR gate 26 and to dual delay circuit 20. Dual delay circuits 14 and 20 respond to this "high" as heretofore described. Each dual delay circuit delays the "high" at its input for a predetermined interval which may be, for example, 0.2 seconds, and then provides a "high" at its output which energizes solenoid 18 for changing arm 16A of switch 16 from position C to position D. This removes power from transceiver receiver 48 and applies power to transceiver transmitter 50. Power is removed from transceiver receiver 50 and returned to transmitter receiver 48 only after the output of microphone amplifier 34 is absent for a predetermined interval which may be, for example, 0.75 seconds. Power is returned to AM receiver 38 and to FM receiver 42 only after the outputs of transceiver receiver 48 and microphone amplifier 34 have been absent for an interval of, for example, 3.0 to 5.0 seconds. The aforenoted intervals are provided by dual delay circuits 14 and 20 as will be hereinafter described with reference to FIGS. 5 and 6. With the arrangement described, the user transmits a message against a background of silence or against a background of his own voice.

Audio detector 24 can be arranged to respond to input levels that exceed a fixed threshold, or can be arranged to be adaptive so as to respond to input levels that exceed a variable threshold. The adaptive arrangement is particularly valuable to motorcycle users who may experience varying levels of engine-induced or wind-induced noise that would otherwise trigger audio detector 24.

The various enabling or disabling as described herein may be accomplished not only through the power supply as shown, but also by shunting various signals to ground or biasing off certain stages.

Some applications may use only a transceiver, without an AM/FM radio. Other applications may use an AM or FM radio, but not both. Still other applications may use a short wave-band or television sound-band radio, either along or in various combinations with the AM and/or FM radio as aforenoted.

FM receiver 42 may be stereo and may have its own antenna independent of antenna 44 and antenna network 46.

So far, the circuit description and operation applies to a transceiver operating in a half-duplex mode. That is, transmitter receiver 48 and transceiver transmitter 50 both operate on the same frequency, but never at the same time. This mode of operation is shown in FIG. 1. Thus, a conversation can only alternate between a transmitting user and a receiver user. If both users speak at the same time, neither will hear the other.

Figure 7:
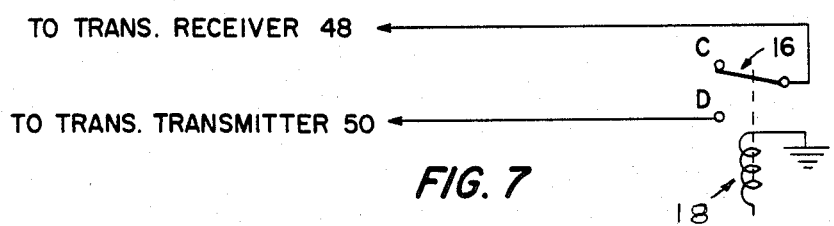
FIG. 7 is a modification of a portion of the block diagram of FIG. 1, wherein the transceiver circuitry is illustrated in full-duplex configuration.

FIG. 7 illustrates a full-duplex transceiver mode. In this mode the transceiver has a transmitter operating on a frequency different than the frequency to which the transceiver receiver is tuned. Thus, with a full-duplex transceiver, its receiver is powered directly from switch 8 instead of through one terminal of switch 16. Now, the effect of an outgoing message is to disable AM and FM receivers 38 and 42 and to enable transmitter 50. Receiver 48 is unaffected. This allows both the transmitting user and the receiver user to speak at the same time and still hear each other, as with an ordinary telephone.

The effect of incoming messages on a full-duplex transceiver remains as earlier described.

DUAL DELAY CIRCUITS

Dual delay circuits 14 and 20, which provide the aforenoted time delay intervals, are generally shown in FIG. 1 and are more particularly shown and described with reference to FIGS. 5 and 6.

The input to the dual delay circuits is at either a "high" or "low" level as aforenoted. The "low" level is near ground and the high level is near the level of the voltage provided by battery 7. For purposes of describing the circuit of FIG. 5, a switch 60 is shown which has an arm selectively positioned on terminals "E" or "F", and shown positioned on terminal F as an example. Terminal E is connected to battery 7 through a resistor 61 and terminal F is connected to ground through a resistor 62.

Figure 5:
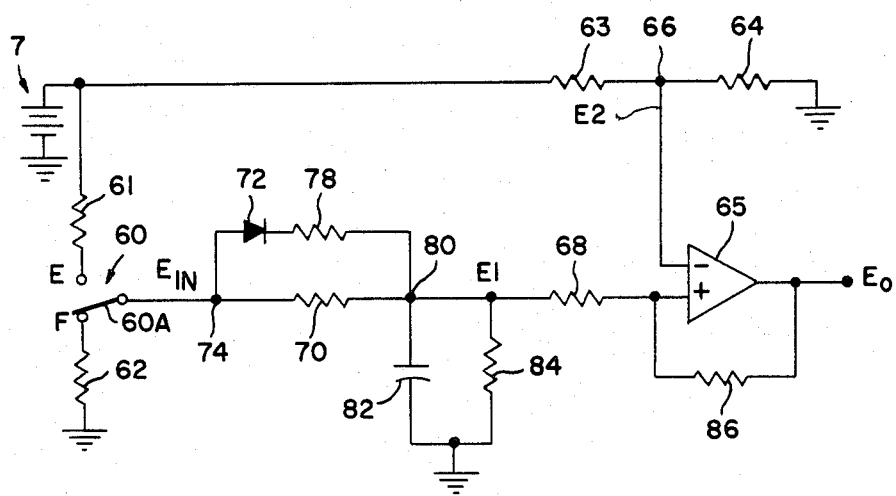
FIG. 5 is an electrical schematic diagram showing in substantial detail dual delay circuits shown generally in FIG. 1.
Figure 6:
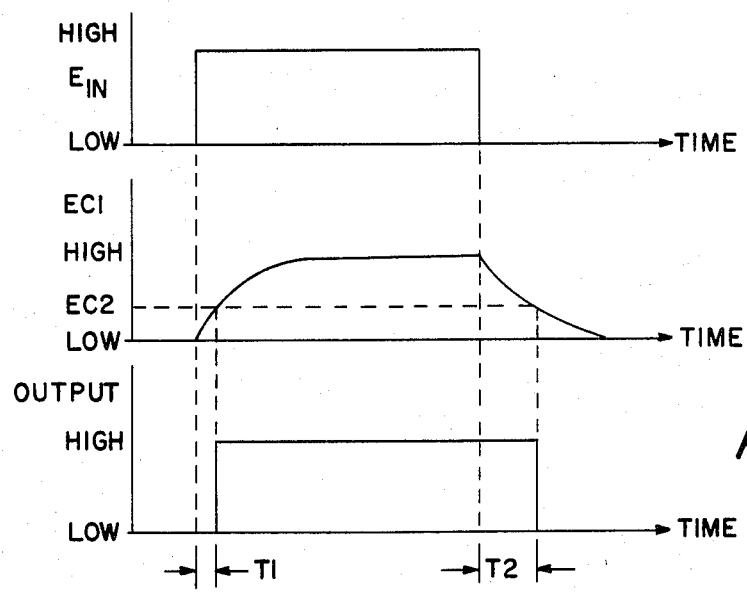
FIG. 6 is a timing diagram relative to the schematic diagram of FIG. 5.

With continued reference to FIGS. 5 and 6, battery 7 is connected to a resistor 63 which in turn is connected to a grounded resistor 64. The inverting input terminal (−) of a comparator amplifier 65 is connected to a circuit point 66 between resistors 63 and 64. A non-inverting input terminal (+) of amplifier 65 is connected through serially connected resistors 68 and 70 to arm 60A of switch 60. A diode 72 is connected to a circuit point 74 between switch arm 60A and resistor 70. A resistor 78 is serially connected to diode 72 and is connected to a circuit point 80 between resistors 68 and 70. A capacitor 82 is connected to a circuit point 80 and is connected to ground, and a resistor 84 is connected in parallel with capacitor 82. A resistor 86 is connected to the output of amplifier 65 and to the non-inverting (+) input terminal thereof.

When the input ($E_{in}$) to the dual delay circuit is "high", it appears at the output of comparator 65 ($E_o$) after an interval T1. T1 is established by resistor 61, resistor 78, resistor 70, resistor 84, and voltage E2. Voltage E2 may be a fixed percentage of the voltage from battery 7 established by resistors 63 and 64; or a variable voltage controlled by a user-operated switch (not shown); or may be derived from a point in the circuitry that represents the output of the microphone averaged over a period of ten to fifteen seconds (not shown).

When the "high" input is replaced by a "low" input the output of comparator 65 ($E_o$) goes "low" after an interval of T2. T2, which is longer than T1, is established by resistor 62, resistor 70, resistor 84, capacitor 82 and voltage E2. Diode 72 prevents resistor 78 from affecting interval T2. The different values of T1 and T2 may also be achieved by feeding back the output of comparator 65 ($E_o$) to its non-inverting (+) input terminal via resistor 86. Resistor 68 reduces the effect of resistor 86 on voltage E1, the voltage between circuit point 80 and ground.

As aforenoted, in the instance of dual delay circuit 20 interval T1 is 0.2 seconds and interval T2 is 0.75 seconds. In the instance of dual delay circuit 14, interval T1 is 0.2 seconds and interval T2 is 3.0 to 5.0 seconds.

Operation of dual delay circuits 14 and 20 as described is based on the exponential charge and discharge of a capacitor (82). The operation could as well be based on a linear charge and/or discharge of an inductor or a capacitor, or on variable pulse counting methods well understood by those skilled in the art.

The remaining components in FIG. 1, that is to say OR gate 26, audio detectors 22 and 24, audio amplifier 28, microphone amplifier 34, AM receiver 38, FM receiver 42, transceiver receiver 48, transceiver transmitter 50 and antenna network 46 are conventional circuits and are well known in the art.

HELMET SUPPORT

As heretofore noted the circuitry previously described is supported by a helmet which is worn by a user of the invention. This feature will next be described with reference to FIGS. 2, 3 and 4, wherein the circuitry is shown supported within a helmet.

A helmet is designated generally by the numeral 90. A modular housing 92 is disposed within the bottom of the helmet. Modular housing 92 contains the circuitry heretofore described and has speakers 30 (FIG. 1) extending therefrom so as to be adjacent the ears of the user.

Figure 2:
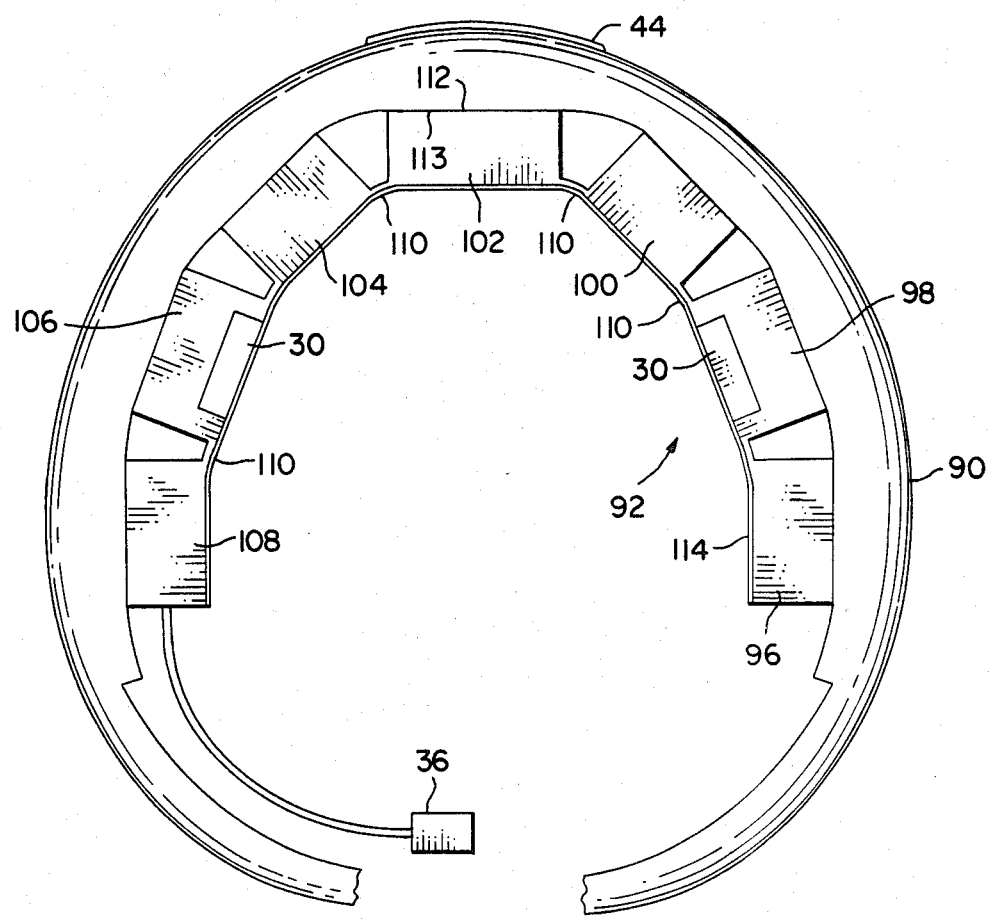
FIG. 2 is a diagrammatic representation of a circuitry package supported by a helmet according to the invention.

With particular reference to FIG. 2, modular housing 92 includes a plurality of modules shown as seven in number and designated by numerals 96, 98, 100, 102, 104, 106, and 108. Modular housing 92 may be constructed of a suitable, relatively resilient plastic material such as polypropylene, with modules 96–108 being in cartridge form so as to accept printed circuit boards. The printed circuit boards contain the circuit components shown and described with reference to FIGS. 1, 5, and 7.

Figure 3:
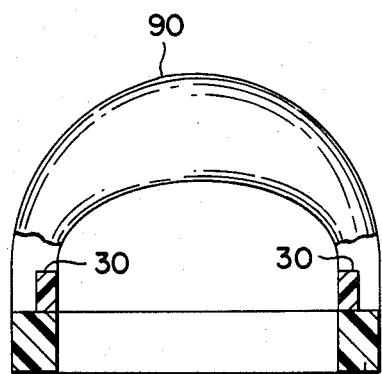
FIG. 3 is a front view illustrating the circuitry package shown in FIG. 2 supported within the helmet.
Figure 4:
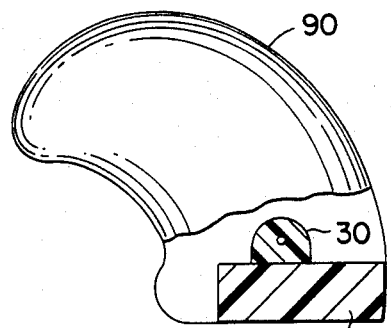
FIG. 4 is a side view relative to FIG. 3.

Two speakers 30 may be located as shown in FIGS. 2, 3, and 4 or a single speaker may be used at either location or at another location such as at the rear center of the helmet.

Modules 96–108 are interconnected by integral channels such as 110 to provide a flexible, continuous, relatively resilient modular housing. The circuit components in the modules are connected via conductors passing through channels 110. Microphone 36 may extend from module 108 and speakers 30 may extend from modules 98 and 106, respectively.

With modular housing 92 constructed as aforenoted, it will spring against the inside surface of helmet 90 when inserted therein and have a tendency to be retained on said inside surface. To secure the modular housing in its appropriate position, a fastening means such as Velcro or mechanical members such as rivets at helmet surface 112 and modular housing surface 113 may be provided. Microphone 36 extends around the helmet at the bottom portion thereof, which bottom portion will be recognized as the chin portion of the helmet. Antennas 40 and 44 are appropriately connected to the circuitry in modular housing 92. AM antenna 40 may simply be a wire or a ferrite rod antenna (not shown) extending within the appropriate module, while FM antenna 44 may be of the printed circuit type or a wire appropriately fastened to the outside of the helmet as shown, and connected to the circuitry through appropriate conductors well understood in the art. An appropriate cloth or plastic cover 114 may extend around the outside surface of modular housing 92 to protect the circuitry within.

With the arrangement shown, the circuitry is secured within the helmet in a manner which is convenient to the user and which will provide a minimum amount of interference with the use of the helmet. Modular housing 92 is constructed so that it can be adapted to a variety of helmet sizes and helmet shapes, and no particular modification of the helmet need be made to accommodate the housing, except in the case of retrofitting when a portion of the interior of the helmet must be removed to provide space for the housing.

There has thus been described a system including circuitry housed in a single package supported by a helmet of the type worn by mobile users such as motorcycle riders, bicycle riders, moped riders and the like, or non-mobile users such as firemen, policemen, construction workers and the like.

Although the invention has been described with the circuit housing supported within the helmet, other configurations are within the scope of the invention. For example some configurations may feature the circuit housing supported outside the helmet or, on closed-face helmets, the circuit housing may be mounted inside the chin piece.

What is claimed is:

1. A helmet-supported radio transceiver and radio receiver system, comprising:
   a flexible, relatively resilient housing having a plurality of interconnected modules, and supported by the helmet;
   radio receiver means disposed within the modules and normally enabled for receiving radio broadcasts;
   radio transceiver means disposed within the modules for transmitting and receiving messages to and from a remote station, the receiver of the radio transceiver means being normally enabled and the transmitter thereof being normally disabled;
   circuit means including power supply means disposed within the modules and connected to the radio receiver means and to the transceiver means;
   the circuit means being responsive to messages received through the receiver of the transceiver means for disabling the radio receiver means so that said received messages are heard by a user against a background of silence;
   the circuit means being operative in a mode so as to be responsive to messages transmitted by the user through the transmitter of the transceiver means for disabling the radio receiver means and the receiver of the transceiver means, and enabling the transmitter of the transceiver means so that the messages are transmitted to the remote station; and
   said circuit means including means responsive to the messages received through the receiver of the transceiver means for disabling the radio receiver means after a first predetermined interval and for maintaining said radio receiver means disabled for a second predetermined interval after the received message ends, means operative in one mode and responsive to messages transmitted by the user through the transmitter of the transceiver means for disabling the radio receiver means and the receiver of the transceiver means and for enabling the transmitter of the transceiver means after a third predetermined interval, and for maintaining the transmitter of the transceiver means enabled for a fourth predetermined interval after the transmitted messages end, and means for enabling the radio receiver means after the transmission and reception of messages through the transmitter and the receiver of the transceiver means, respectively, have been absent for a fifth predetermined interval.

2. A system as described by claim 1, wherein:
   the circuit means is responsive to messages transmitted by the user through the transmitter of the transceiver means for disabling the radio receiver means, and enabling the transmitter of the transceiver means so that the messages are transmitted to the remote station against a background of silence.

3. A system as described by claim 1, wherein:
   the circuit means is responsive to messages transmitted by the user through the transmitter of the transceiver means for disabling the radio receiver means, and enabling the transmitter of the transceiver means so that the messages are transmitted to the remote station against a background of the user's voice.

4. A system as described by claim 1, wherein:
   the housing supported by the helmet is disposed on the inside of the helmet near the bottom thereof and assumes the contours of the inside of the helmet; and
   means are provided in association with the inside of the helmet and with the housing for maintaining the housing so disposed on the inside of the helmet.

5. A system as described by claim 1, wherein:
   the housing supported by the helmet is disposed on the inside of the helmet near the bottom thereof and assumes the contours of the inside of the helmet; and
   means are provided in association with the inside of the helmet and with the housing for maintaining the housing so disposed on the inside of the helmet.

6. A system as described by claim 1, wherein:
   the circuit means is operative in another mode so as to be responsible to messages transmitted by the user through the transmitter of the transceiver means for disabling the radio receiver means and enabling the transmitter of the transceiver means, with the receiver of the transceiver means remaining enabled, so that messages are transmitted and received to and from the remote station.

7. A system as described by claim 1, wherein:
   the means operative in one mode is operative in another mode so as to be responsive to messages transmitted by the user through the transmitter of the transceiver means for disabling the radio receiver means and enabling the transmitter of the transceiver means, with the receiver of the transceiver means remaining enabled, after the third predetermined interval.

8. A helmet-supported radio transceiver and radio receiver system, comprising:

a flexible, relatively resilient housing having a plurality of interconnected modules, and supported by the helmet;

radio transceiver means and radio receiver means supported within the modules;

a microphone supported by the housing and connected to the transceiver means;

speaker means supported by the housing and connected to the transceiver means and to the radio receiver means;

circuit means including supply means supported within the modules and connected to the transceiver means, the radio receiver means, the microphone and the speaker means;

the circuit means including first means responsive to the voice of a user spoken through the microphone to transmit a message to a remote station and to disable the radio receiver means, and second means responsive to the voice of the user for disabling the receiver of the transceiver means and enabling the transmitter of the transceiver means;

the first means including first time delay means for disabling the radio receiver means for a first predetermined interval;

the second means including second time delay means for disabling the receiver of the transceiver means and enabling the transmitter of said transceiver means while the user speaks into the microphone and for a second predetermined interval thereafter, and the second time delay means disabling the transmitter of the transceiver means and enabling the receiver of said transceiver means after the second predetermined interval so that the user can hear a message from a remote station; and the first time delay means effective for maintaining the radio receiver means disabled for a third predetermined interval after the end of transmission and reception of messages through the transmitter and the receiver, respectively, of the transceiver means.

9. A system as described by claim 8, wherein:
the housing supported by the helmet is disposed on the inside of the helmet near the bottom thereof and assumes the contours of the inside of the helmet; and means are provided in association with the inside of the helmet and with the housing for maintaining the housing so disposed on the inside of the helmet.

10. A system as described by claim 8, wherein:
the first means responsive to the voice of a user spoken through the microphone to transmit a message to a remote station disables the radio receiver means, and the second means responsive to the voice of the user disables the receiver of the transceiver means and enables the transmitter of the transceiver means through the power supply means.

11. A system as described by claim 8, wherein:
the second means is responsive to the voice of the user for enabling the transmitter of the transceiver means, with the receiver of the transceiver means remaining enabled.

12. A helmet supported radio transceiver and radio receiver system, comprising:

a flexible, relatively resilient housing having a plurality of interconnected modules, and supported on the inside of the helmet near the bottom thereof so as to assume the contour of the inside of the helmet;

means provided in association with the helmet and with the housing for maintaining the housing so disposed on the inside of the helmet;

radio transceiver means and radio receiver means supported within the modules;

a microphone supported by the housing and connected to the transceiver means;

speaker means supported by the housing and connected to the transceiver means and to the radio receiver means;

circuit means including power supply means supported within the modules and connected to the transceiver means, the radio receiver means, the microphone and the speaker means, and effective for disabling the radio receiver means when a user transmits a message to a remote station through the microphone and the transmitter of the transceiver means and effective for disabling the radio receiver means when the user receives a message from the remote station through the speaker means and the receiver of the transceiver means, so that the messages are transmitted and received without radio broadcasts being received through the radio receiver means and the speaker means; and said circuit means including means responsive to the messages received through the receiver of the transceiver means for disabling the radio receiver means after a first predetermined interval and for maintaining said radio receiver means disabled for a second predetermined interval after the received messages end, means operative in one mode and responsive to messages transmitted by the user through the transmitter of the transceiver means for disabling the radio receiver means and the receiver of the transceiver means and for enabling the transmitter of the transceiver means after a third predetermined interval, and for maintaining the transmitter of the transceiver means enabled for a fourth predetermined interval after the transmitted messages end, and means for enabling the radio receiver means after the transmission and reception of messages through the transmitter and the receiver of the transceiver means, respectively, have been absent for a fifth predetermined interval.

13. A system as described by claim 12, wherein:
the modules are interconnected through channels; and the radio transceiver means, the radio receiver means, the microphone, the speaker means and the circuit means are electrically connected by connecting means extending through the channels from one module to another.

* * * * *